US010563747B2

(12) United States Patent
Balsiger

(10) Patent No.: US 10,563,747 B2
(45) Date of Patent: Feb. 18, 2020

(54) METHOD FOR CONDENSATION REDUCTION IN LINEAR ELECTROMECHANICAL ACTUATORS

(71) Applicant: Hamilton Sundstrand Corporation, Charlotte, NC (US)

(72) Inventor: Derick S. Balsiger, Mayer, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 405 days.

(21) Appl. No.: 15/650,741

(22) Filed: Jul. 14, 2017

(65) Prior Publication Data

US 2017/0314667 A1    Nov. 2, 2017

Related U.S. Application Data

(62) Division of application No. 14/672,416, filed on Mar. 30, 2015, now Pat. No. 9,739,362.

(51) Int. Cl.
*F16H 57/027*   (2012.01)
*F16K 24/00*    (2006.01)
*H02K 41/02*    (2006.01)
*H02K 5/10*     (2006.01)

(52) U.S. Cl.
CPC .......... *F16H 57/027* (2013.01); *F16K 24/00* (2013.01); *H02K 5/10* (2013.01); *H02K 41/02* (2013.01); *H02K 2205/09* (2013.01)

(58) Field of Classification Search
CPC .... F16H 57/027; F16H 25/20; F16H 25/2418; H02K 41/02; H02K 5/10
See application file for complete search history.

(56) References Cited

U.S. PATENT DOCUMENTS

| 2,515,950 | A |   | 7/1950 | Dingman |            |
|-----------|---|---|--------|---------|------------|
| 3,161,074 | A | * | 12/1964| Korthaus | E05F 15/622 |
|           |   |   |        |         | 74/89.34   |
| 5,041,748 | A | * | 8/1991 | Huber   | F16H 25/2204 |
|           |   |   |        |         | 192/141    |
| 7,218,022 | B2| * | 5/2007 | Pfister | F16H 25/20 |
|           |   |   |        |         | 310/20     |
| 2004/0217657 | A1 |   | 11/2004 | Potter |            |

(Continued)

FOREIGN PATENT DOCUMENTS

CH        661147 A5 *  6/1987
EP       1921732 A1    5/2008

(Continued)

OTHER PUBLICATIONS

EPO Machine Translation of CH 661147 (A5), Alex, Jun. 30, 1987 (Year: 1987).*

(Continued)

*Primary Examiner* — Vinh Luong
(74) *Attorney, Agent, or Firm* — Kinney & Lange, P.A.

(57) ABSTRACT

A method for reducing condensation includes moving a linear motor slider that is positioned within a housing of an actuator. A first gas is pushed out of a transfer plate chamber through a first vent. A second gas is drawn into the transfer plate chamber through a second vent. Moisture is removed from the second gas as the second gas is being drawn into the transfer chamber by passing the second gas through at least one of a hydrophobic or oleophobic material.

17 Claims, 3 Drawing Sheets

(56) References Cited

U.S. PATENT DOCUMENTS

| | | | |
|---|---|---|---|
| 2005/0073204 A1* | 4/2005 | Puterbaugh | H02K 5/10 |
| | | | 310/89 |
| 2008/0141803 A1* | 6/2008 | Christensen | F16H 25/20 |
| | | | 74/89.4 |
| 2008/0190104 A1* | 8/2008 | Bresie | F15B 7/006 |
| | | | 60/476 |
| 2008/0223347 A1* | 9/2008 | Hommes | F01M 13/022 |
| | | | 123/572 |
| 2009/0033157 A1 | 2/2009 | Maemura et al. | |
| 2013/0320782 A1 | 12/2013 | Matalanis et al. | |
| 2017/0187018 A1* | 6/2017 | Pflueger | F16K 15/144 |

FOREIGN PATENT DOCUMENTS

| | | |
|---|---|---|
| EP | 2618468 A1 | 7/2013 |
| WO | WO2010076326 A1 | 7/2010 |

OTHER PUBLICATIONS

Define tortuous Google Search, Oct. 19, 2019 (Year: 2019).*
Extended European Search Report for EP Patent Application No. 16162781.5, dated Aug. 22, 2016, 7 Pages.
Gore Materials Technology, Venting with Hydrophobic vs. Oleophobic Membranes, W.L. Gore & Associates, Inc., gore.com, 2006, 2 Pages.
Gore Membrane Vents, Screw-In Vent:POV/M12x1, W.L. Gore & Associates, Gore Technical Venting Solutions, www.gore.com/ventsolutions, 2002, 2 Pages.

* cited by examiner

METHOD FOR CONDENSATION REDUCTION IN LINEAR ELECTROMECHANICAL ACTUATORS

CROSS-REFERENCE TO RELATED APPLICATION(S)

This application is a divisional of U.S. application Ser. No. 14/672,416 filed Mar. 30, 2015 for "METHOD FOR CONDENSATION REDUCTION IN LINEAR ELECTRO-MECHANICAL ACTUATORS" by D. Balsiger. The present invention relates to electromechanical actuators, and in particular, to a method for reducing moisture in linear electromechanical actuators.

BACKGROUND

The recent trend in modern aircraft is towards developing an all-electric aircraft. Electromechanical Actuators ("EMA") can be used to fulfill the actuation needs in all-electric aircraft. Since EMAs are electronic devices, EMAs are prone to damage sustained due to moisture. Condensation and seal failure are examples of instances resulting in moisture ingress into an EMA.

SUMMARY

A method for reducing condensation includes moving a linear motor slider that is positioned within a housing of an actuator. A first gas is pushed out of a transfer plate chamber through a first vent. A second gas is drawn into the transfer plate chamber through a second vent. Moisture is removed from the second gas as the second gas is being drawn into the transfer chamber by passing the second gas through at least one of a hydrophobic or oleophobic material.

DETAILED DESCRIPTION

An EMA's thermal cycle is based on its usage. When an EMA increases in temperature, the air enclosed in the EMA expands putting undesirable load on seals in the EMA. When the temperature in the EMA decreases, the moisture in the air inside of the EMA condenses into water. When the temperature in the EMA decreases below freezing, the water can form into ice, and in extreme cases the ice can fill the air gap within the motor causing failure. One example of procedure currently in use to remove water is to use a drain hole to drain water from the EMA. The drain hole can become plugged or allow foreign material to enter the EMA. Internal heaters are also used in EMAs to keep the moisture laden air above the dew point so that liquid water doesn't form inside the EMAs. While heaters work to keep the liquid from forming, heaters use power and take up valuable weight and space in the EMA.

Figure 1A:
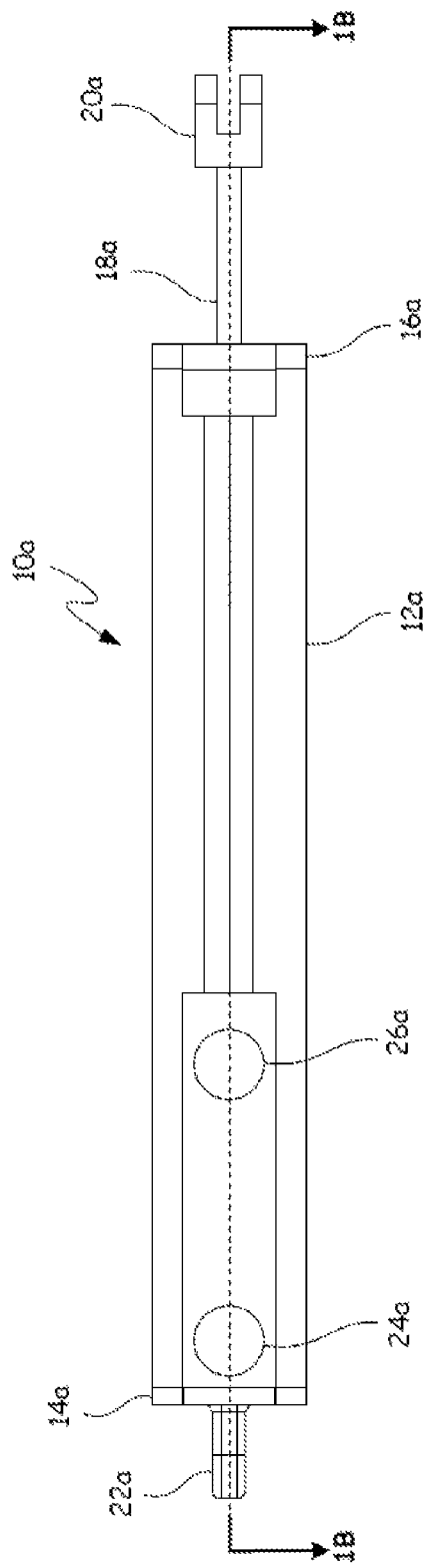
FIG. 1A is an elevation view of an electromechanical actuator.

FIG. 1A is an elevation view of electromechanical actuator 10a. Electromechanical actuator 10a includes housing 12a, aft cover 14a, forward cover 16a, and linear motor slider 18a. Housing 12a contains a portion of linear motor slider 18a. The portion of linear motion slider 18a not contained in housing 12a includes clevis 20a. Clevis 20a is attached to linear motion slider 18a. Clevis 20a is configured to engage with a kinetic element (not shown) that connects to electromechanical actuator 10a. Aft cover 14a is attached to housing 12a and is positioned on an aft end of housing 12a. Forward cover 16a is attached to housing 12a and is positioned on a forward end of housing 12a opposite the aft end of housing 12a. Airframe mount 22a is disposed on the aft end of housing 12a and is formed with aft cover 14a. Airframe mount 22a is configured to pivotally mount onto an element of an aircraft. Electromechanical actuator 10a may include a linear electromechanical actuator or other various types of electromechanical actuators.

Aft vent 24a and forward vent 26a are located on housing 12a. Aft vent 24a is located near aft cover 14a. Forward vent 26a is located between aft vent 24a and forward cover 16a. In the present embodiment, both aft vent 24a and forward vent 26a are positioned along the same face of housing 12a. Aft vent 24a and forward vent 26a allow entry and exit of a gas from housing 12a during operation of electromechanical actuator 10a, as described in more detail below with reference to FIG. 1B.

Figure 1B:
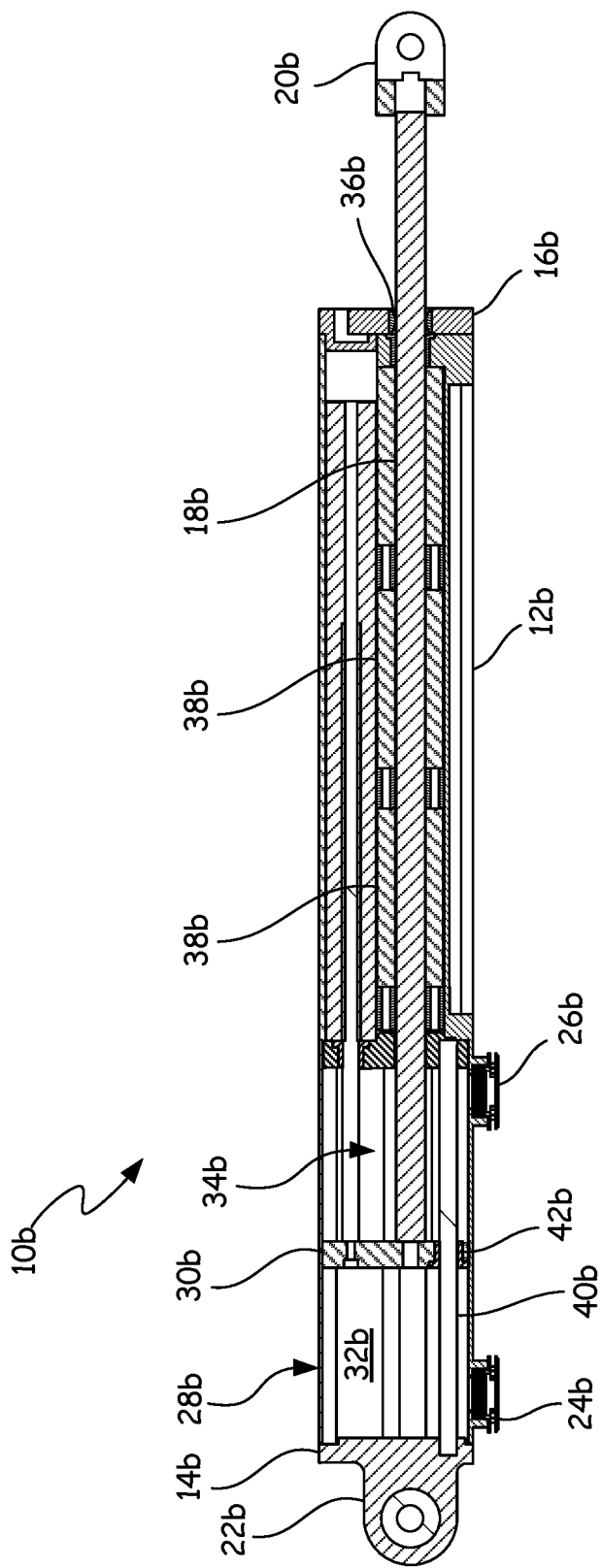
FIG. 1B is a cross-sectional view of an electromechanical actuator taken along 1B-1B shown in FIG. 1A.
Figure 2:
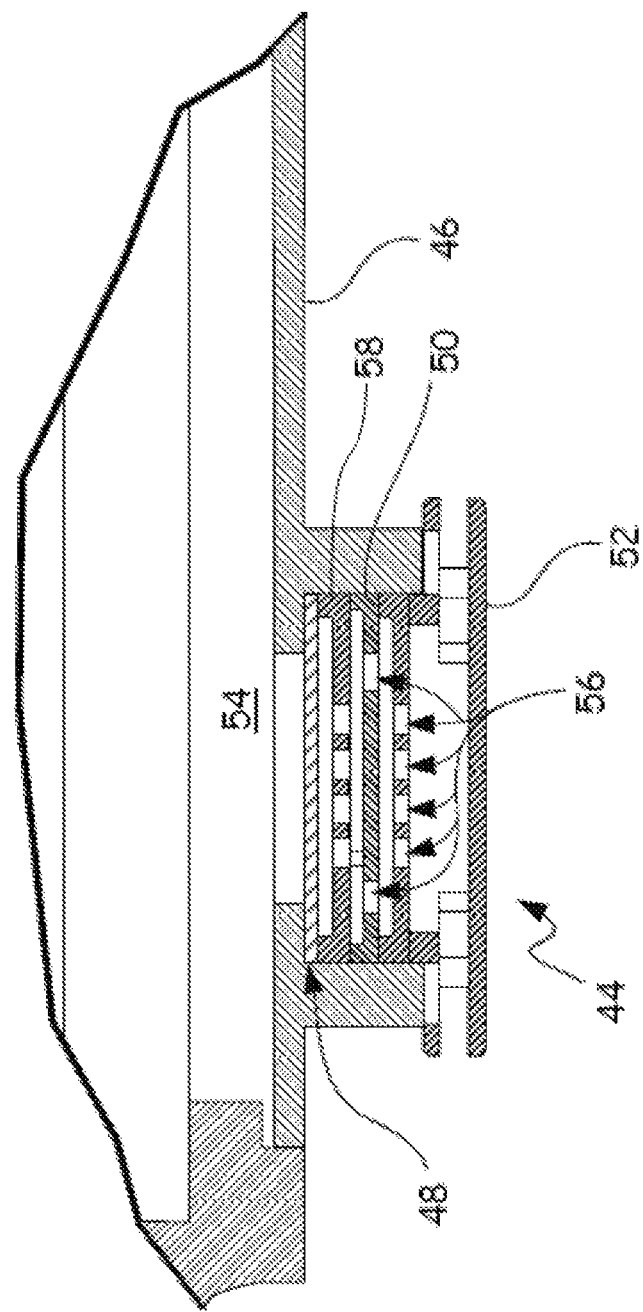
FIG. 2 is a cross-sectional view of an electromechanical actuator vent taken along 1B-1B shown in FIG. 1A.

FIG. 1B is a cross-sectional view of electromechanical actuator 10b taken along section 2-2. Electromechanical actuator 10b includes housing 12b, aft cover 14b, forward cover 16b, and linear motor slider 18b. For clarity, the character reference numerals for the elements of FIG. 1B include the letter "b", in comparison to the character reference numerals for the elements in FIG. 1A that include the letter "a". As discussed herein, the character reference numerals used for specific elements with respect to FIGS. 1A and 1B can be used interchangeably, such as for example "housing 12b" can be used to refer to the same element as "housing 12a", and so on and so forth. Housing 12b contains a portion of linear motor slider 18b. The portion of linear motion slider 18b not contained in housing 12b includes clevis 20b. Clevis 20b is attached to linear motion slider 18b. Clevis 20b is configured to engage with a kinetic element (not shown) that connects to electromechanical actuator 10b. Aft cover 14b is attached to housing 12b and is positioned on an aft end of housing 12b. Forward cover 16b is attached to housing 12b and is positioned on a forward end of housing 12b opposite the aft end of housing 12b. Airframe mount 22b is disposed on the aft end of housing 12b and is formed with aft cover 14b. Airframe mount 22b is configured to pivotally mount onto an element of an aircraft. Aft vent 24b and forward vent 26b are located on housing 12b.

Housing 12b also includes transfer plate chamber 28b. Transfer plate chamber 28b is divided into two portions by transfer plate 30b. Transfer plate 30b divides transfer plate chamber 28b into transfer plate chamber aft side 32b and transfer plate chamber forward side 34b. Aft vent 24b allows fluid communication between transfer plate chamber aft side 32b and the outside of housing 12. Forward vent 26b allows fluid communication between transfer plate chamber forward side 34b and the outside of housing 12.

Linear motion slider 18b enters housing 12b through forward cover 16b. Seal 36b is positioned between linear motion slider 18b and forward cover 16b. Seal 36b enables linear motion slider 18b to slide in and out of housing 12b while preventing contaminants from entering housing 12b. Linear motor stators 38b are located within housing 12b and circumferentially surround linear motor slider 18b. Linear motor stators 38b create a magnetic field which interacts with linear motion slider 18b causing linear motion slider 18b to actuate. As linear motion slider 18b actuates, transfer plate 30b slides along guide rod 40b. Guide rod 40b is positioned within transfer plate chamber 28b and guides the linear motion of transfer plate 30b along a linear path of travel. Transfer plate 30b includes guide rod bushing 42b which receives guide rod 40b.

As linear motion slider 18b moves along housing 12b, transfer plate 30b moves in either an aft or forward direction. As transfer plate 30b moves in an aft direction, gas in transfer plate chamber aft side 32b will compress and a slight vacuum will be formed in transfer plate chamber forward side 34b. As gas in transfer plate chamber aft side 32b compresses, a first gas is pushed out of transfer plate chamber aft side 32b and through aft vent 24b. As the slight vacuum is formed in transfer plate chamber forward side 34b, a second gas is drawn into transfer plate chamber forward side 34b through forward vent 26b. Likewise, as transfer plate 30b moves in a forward direction, gas in transfer plate chamber forward side 34b will compress and a slight vacuum will be formed in transfer plate chamber aft side 32b. As gas in transfer plate chamber forward side 34b compresses, a third gas is pushed out of transfer plate chamber forward side 34b and through forward vent 26b. As the slight vacuum is formed in transfer plate chamber aft side 32b, a fourth gas is drawn into transfer plate chamber aft side 32b through aft vent 24b.

Each of aft vent 24b and forward vent 26b include either a hydrophobic or oleophobic material. As the second gas is drawn into transfer plate chamber 28b through either aft vent 24b or forward vent 26b, the amount of moisture contaminants such as water, oil, and other fluid contaminants removed from the gas are controlled as the gas enters transfer plate chamber 28b. A hydrophobic membrane in either aft vent 24b or forward vent 26b would control and/or minimize the amount of water moisture from the second gas being drawn into transfer plate chamber 28b. An oleophobic membrane in either aft vent 24b or forward vent 26b would control and/or minimize the amount of oil moisture from the second gas being drawn into transfer plate chamber 28b. Additionally, aft vent 24b and forward vent 26b may remove other types of moisture or liquid contaminants from the gas being drawn into transfer plate chamber 28b. Aft vent 24b and forward vent 26b may also remove various types of particulate contaminants from the second gas being drawn into transfer plate chamber 28b.

As transfer plate 30b moves in an aft direction, moist gas will be pushed out of aft vent 24b and dry gas will be drawn in through forward vent 26b. As transfer plate 30b moves in a forward direction, moist gas will be pushed out of forward vent 26b and dry gas will be drawn in through aft vent 24b. This action will actively force moisture laden gas out of and draw clean dry air into electromechanical actuator 10b. Additionally, as electromechanical actuator 10b heats up, the expansion of the gas inside of transfer plate chamber 28b will force moisture laden gas out of transfer plate chamber 28b through either aft vent 24b or forward vent 26b. As electromechanical actuator 10b cools down, the pressure inside transfer plate chamber 28b will decrease therefore drawing clean dry gas into transfer plate chamber 28b. The availability of gas to flow through aft vent 24b and forward vent 26b allows for air pressure within transfer plate chamber 28b and air pressure outside of electromechanical actuator 10b to be in near pressure equilibrium reducing the amount of pressure fatigue experienced by aft vent 24b and forward vent 26b.

The active, piston like nature, of electromechanical actuator 10 is used to actively recirculate moisture laden gas with clean dry gas. This recirculation of gas protects the electrical components within electromechanical actuator 10 from condensation.

FIG. 3 is a cross-sectional view of vent 44. Vent 44 is located in a portion of housing 46 and includes membrane 48, spacer plates 50, and vent cover 52. Membrane 48 is positioned fluidly adjacent to transfer plate chamber 54. Spacer plates 50 are positioned between membrane 48 and vent cover 52. Vent cover 52 is positioned at a distal end of vent 44 away from housing 46.

Membrane 48 may include a hydrophobic, oleophobic, or other type of filtering membrane to control transmission of moisture and/or particulate contaminants into transfer plate chamber 54. Membrane 48 is designed to allow one-way passage of contaminants out of transfer plate chamber 54 while minimizing transmission of moisture and/or particulate contaminants into transfer plate chamber 54. An example of membrane 48 can include an oleophobic membrane produced by Gore. An example of the material used for membrane 48 can include polytetrafluoroethylene (ePTFE).

Spacer plates 50 include openings 56. Openings 56 are configured to provide a tortuous flowpath through vent 44. The tortuous flowpath includes a non-linear passage along the flowpath. The tortuous flowpath requires a fluid passing vent 44 to take multiple twists and turns before passing from one end of vent 44 to the other. Specifically, the tortuous flowpath is designed to inhibit a flow of flames through vent 44. This configuration is also applicable to previous embodiments of the present disclosure such that an aft vent may include a first tortuous flowpath and a forward vent may include a second tortuous flowpath. The configuration and/or quantities of spacer plates 50 and openings 56 can be varied to produce desired performance characteristics of vent 44. Vent 44 may also include support plate 58. Support plate 58 is a flat piece of solid material with one or more orifices. Support plate 58 provides membrane 48 with structural support as gas is drawn in and out of transfer plate chamber 54. For example, support plate 58 can support at least one of the at least one of hydrophobic and oleophobic materials (e.g., membrane 48) as the second gas is passed through the at least one of hydrophobic and oleophobic materials.

DISCUSSION OF POSSIBLE EMBODIMENTS

The following are non-exclusive descriptions of possible embodiments of the present disclosure.

An actuator may include a housing. The housing may include a linear motion slider with a portion of the linear motion slider positioned in the housing. A transfer plate may be disposed on an end of the linear motion slider. A transfer plate chamber may be positioned within the housing, wherein the transfer plate may divide the transfer plate chamber into an aft chamber and a forward chamber. An aft vent may be disposed in the aft chamber. The aft vent may include a first membrane positioned over the aft vent. A forward vent may be disposed in the aft chamber. The forward vent may include a second membrane positioned over the forward vent. The first and second membranes may include at least one of hydrophobic and oleophobic materials.

The actuator of the preceding paragraph can optionally include, additionally and/or alternatively, any one or more of the following features, configurations and/or additional components:

a further embodiment of the foregoing actuator, wherein the actuator may include a linear electromechanical actuator;

a further embodiment of the foregoing actuator, wherein the at least one of hydrophobic and oleophobic materials may control the amount of moisture drawn into the transfer plate chamber;

a further embodiment of the foregoing actuator, wherein the at least one of hydrophobic and oleophobic materials may minimize the amount of moisture drawn into the transfer plate chamber;

a further embodiment of the foregoing actuator, wherein the aft vent may include a first tortuous flowpath and the forward vent includes a second tortuous flowpath;

a further embodiment of the foregoing actuator, wherein the first and second tortuous flowpaths may inhibit the flow of flames through the aft vent and the forward vent respectively; and a further embodiment of the foregoing actuator, wherein the at least one of hydrophobic and oleophobic materials may minimize an amount of particulate contaminants from entering the transfer plate chamber.

A method for reducing condensation may include moving a linear motion slider of an actuator. The linear motion slider may be positioned within a housing of the actuator. A first gas may be pushed out of a transfer plate chamber through a first vent. A second gas may be drawn into the transfer plate chamber through a second vent. Moisture may be removed from the second gas as the second gas is being drawn into the transfer plate chamber by passing the second gas through at least one of hydrophobic and oleophobic materials.

The method for reducing condensation of the preceding paragraph can optionally include, additionally and/or alternatively, any one or more of the following features, configurations and/or additional components:

a further embodiment of the foregoing method for reducing condensation, wherein the method may further include actuating a linear electromechanical actuator;

a further embodiment of the foregoing method for reducing condensation, wherein the amount of moisture drawn into the transfer plate chamber with the at least one of hydrophobic and oleophobic materials may be controlled;

a further embodiment of the foregoing method for reducing condensation, wherein the amount of moisture drawn into the transfer plate chamber with the at least one of hydrophobic and oleophobic materials may be minimized;

a further embodiment of the foregoing method for reducing condensation, wherein drawing the second gas into the transfer plate chamber may include drawing the second gas through a tortuous flowpath;

a further embodiment of the foregoing method for reducing condensation, wherein a flow of flames through a first tortuous flowpath in the first vent or through a second tortuous flowpath in the second vent may be inhibited; and a further embodiment of the foregoing method for reducing condensation, wherein an amount of particulate contaminants from entering the transfer plate chamber may be minimized.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for reducing condensation, the method comprising:
   activating a linear electromechanical actuator by moving a linear motor slider of the linear electromechanical actuator, wherein the linear motor slider is positioned within a housing of the linear electromechanical actuator;
   pushing a first gas out of a first transfer plate chamber through a first vent including a first tortuous flowpath;
   drawing a second gas into a second transfer plate chamber through a second vent, wherein drawing the second gas into the second transfer plate chamber includes drawing the second gas through a second tortuous flowpath;
   removing moisture from the second gas as the second gas is being drawn into the second transfer plate chamber by passing the second gas through at least one of hydrophobic and oleophobic materials; and
   inhibiting a flow of flames through the first tortuous flowpath in the first vent or through the second tortuous flowpath in the second vent.

2. The method for reducing condensation of claim 1, the method further including controlling the amount of moisture drawn into the second transfer plate chamber with the at least one of hydrophobic and oleophobic materials.

3. The method for reducing condensation of claim 2, the method further including minimizing the amount of moisture drawn into the second transfer plate chamber with the at least one of hydrophobic and oleophobic materials.

4. The method for reducing condensation of claim 1, the method further including minimizing an amount of particulate contaminants from entering the first and second transfer plate chambers.

5. The method for reducing condensation of claim 1 further comprising forcing the first gas out of the linear electromechanical actuator.

6. The method for reducing condensation of claim 1 further comprising drawing dry air into the linear electromechanical actuator.

7. The method for reducing condensation of claim 1 further comprising recirculating a moisture laden gas with a clean dry gas.

8. The method for reducing condensation of claim 1 further comprising supporting at least one of the at least one of hydrophobic and oleophobic materials with a support plate as the second gas is passed through the at least one of hydrophobic and oleophobic materials.

9. The method for reducing condensation of claim 1, wherein moving the linear motor slider comprises creating a magnetic field with a linear motor stator, wherein the magnetic field interacts with the linear motion slider causing the linear motion slider to actuate.

10. A method for reducing condensation, the method comprising:
    moving a linear motor slider of a linear electromechanical actuator,
       wherein the linear electromechanical actuator comprises:
       a housing;
       a portion of the linear motor slider positioned in the housing;
       a transfer plate disposed on an end of the linear motor slider;

a transfer plate chamber positioned within the housing, wherein the transfer plate divides the transfer plate chamber into an aft chamber and a forward chamber;

an aft vent disposed in the aft chamber, wherein the aft vent includes a first membrane positioned over the aft vent; and a forward vent disposed in the forward chamber, wherein the forward vent includes a second membrane positioned over the forward vent;

pushing a first gas out of the aft chamber through the aft vent;

drawing a second gas into the forward chamber through the forward vent; and removing moisture from the second gas as the second gas is being drawn into the forward chamber by passing the second gas through the second membrane.

11. The method of claim 10, wherein the first and second membranes include at least one of hydrophobic and oleophobic materials.

12. The method for reducing condensation of claim 10 further comprising actuating the linear electromechanical actuator.

13. The method for reducing condensation of claim 12 further comprising controlling the amount of moisture drawn into the forward chamber with at least one of the first and second membranes.

14. The method for reducing condensation of claim 13, further comprising minimizing the amount of moisture drawn into the forward chamber with the at least one of the first and second membranes.

15. The method for reducing condensation of claim 10, wherein drawing the second gas into the forward chamber includes drawing the second gas through a tortuous flowpath.

16. The method for reducing condensation of claim 10, further comprising inhibiting a flow of flames through a first tortuous flowpath in the first vent or through a second tortuous flowpath in the second vent.

17. The method for reducing condensation of claim 10, further comprising minimizing an amount of particulate contaminants from entering the transfer plate chamber.

* * * * *